United States Patent
Craig et al.

(10) Patent No.: US 10,076,076 B2
(45) Date of Patent: Sep. 18, 2018

(54) EXTRACTOR HOOD FOR SUGARCANE HARVESTER

(71) Applicant: Deere & Company, Moline, IL (US)

(72) Inventors: Paul I. Craig, Thibodaux, LA (US); Jeffery E. Freyou, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 102 days.

(21) Appl. No.: 15/337,391

(22) Filed: Oct. 28, 2016

(65) Prior Publication Data
US 2018/0116114 A1    May 3, 2018

(51) Int. Cl.
*A01D 41/12* (2006.01)
*A01D 45/10* (2006.01)
*A01F 12/48* (2006.01)

(52) U.S. Cl.
CPC ......... *A01D 41/1243* (2013.01); *A01D 45/10* (2013.01); *A01F 12/48* (2013.01)

(58) Field of Classification Search
CPC .... A01D 45/10; A01D 45/00; A01D 41/1243; A01D 46/00; A01D 87/10; A01F 12/444; A01F 12/48
USPC .......................................................... 460/111
See application file for complete search history.

(56) References Cited

U.S. PATENT DOCUMENTS

| | | | | |
|---|---|---|---|---|
| 2,953,886 A * | 9/1960 | Douglas | ................ | A01D 45/10 56/13.9 |
| 3,925,199 A * | 12/1975 | Quick | .................... | A01D 45/10 209/139.1 |
| 4,039,434 A * | 8/1977 | Croucher | ............... | A01D 45/10 209/28 |
| 4,121,778 A * | 10/1978 | Quick | .................... | A01D 45/10 209/139.1 |
| 4,196,569 A * | 4/1980 | Quick | .................... | A01D 45/10 198/518 |
| 4,924,662 A * | 5/1990 | Quick | .................... | A01D 45/10 56/12.8 |
| 5,031,392 A * | 7/1991 | Baker | .................... | A01D 45/10 460/123 |
| 5,092,110 A | 3/1992 | Dommert et al. | | |
| 6,272,819 B1 * | 8/2001 | Wendte | ................ | A01D 41/127 460/6 |
| 6,500,062 B1 | 12/2002 | Harris et al. | | |
| 6,656,038 B1 * | 12/2003 | Persson | ............. | A01D 41/1243 460/112 |
| 6,745,550 B1 | 6/2004 | Hinds et al. | | |
| 6,869,356 B2 | 3/2005 | Hinds | | |
| 6,928,800 B2 * | 8/2005 | Huff, Jr. | ................ | A01D 43/14 127/2 |
| 7,297,053 B2 * | 11/2007 | Farley | ................ | A01D 41/1252 460/112 |

(Continued)

*Primary Examiner* — Thomas B Will
*Assistant Examiner* — Joan D Misa

(57) ABSTRACT

An extractor for use with a sugarcane harvester comprises a fan and a hood. The fan is configured to rotate about a fan axis for inducing a cleaning flow of air to separate crop residue from sugarcane billets. The hood is positioned to receive in an interior region of the hood the cleaning flow of air with entrained crop residue from the fan and redirect the cleaning flow of air with entrained crop residue relative to the fan axis to an outlet of the hood to exit from the interior region.

10 Claims, 10 Drawing Sheets

(56) References Cited

U.S. PATENT DOCUMENTS

| | | | |
|---|---|---|---|
| 7,431,537 B2* | 10/2008 | Francis | A01D 87/00 |
| | | | 406/151 |
| 9,119,346 B2* | 9/2015 | Vergote | A01D 45/10 |
| 9,456,547 B2 | 10/2016 | Cazenave et al. | |
| 2015/0327437 A1 | 11/2015 | Mixon et al. | |
| 2017/0108000 A1* | 4/2017 | Junior | F04D 29/384 |
| 2017/0251601 A1* | 9/2017 | Dugas | A01D 41/1276 |

* cited by examiner

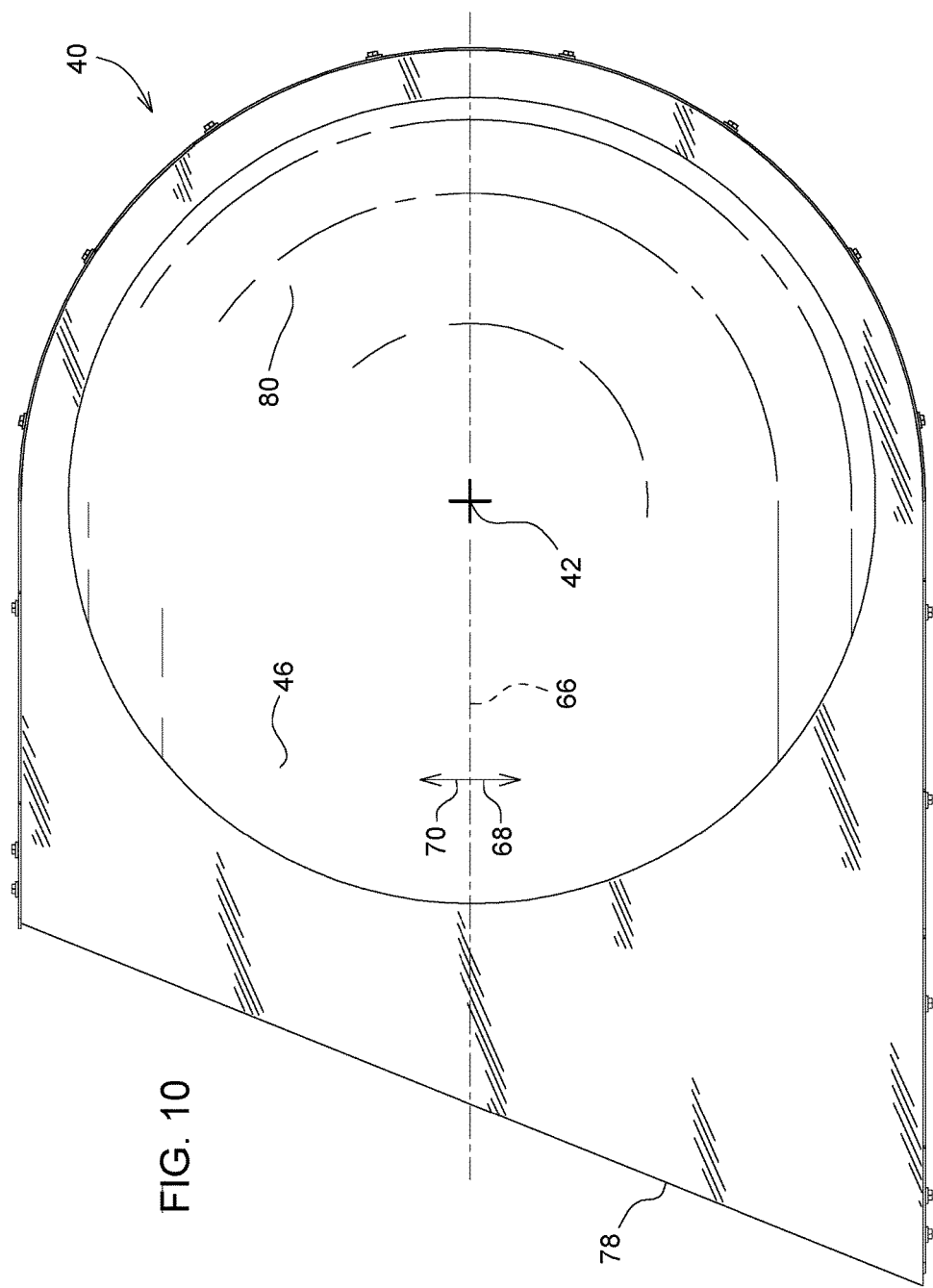

EXTRACTOR HOOD FOR SUGARCANE HARVESTER

FIELD OF THE DISCLOSURE

The present disclosure relates to an extractor hood for use in an extractor of a sugarcane harvester.

BACKGROUND OF THE DISCLOSURE

A sugarcane harvester is configured to sever a mat of sugarcane material and feed that mat to a chopping section where it is chopped, including the stalk which is cut into segments called "billets." The sugarcane harvester advances the billets along with crop residue (e.g., leafy material) to a primary extractor that separates at least a portion of the crop residue from the billets and removes the separated crop residue from the sugarcane harvester. However, some crop residue may remain with the billets as the billets travel up an elevator for discharge into a wagon to be hauled away. The sugarcane harvester may have a secondary extractor that separates crop residue from the billets discharged by the elevator and removes the separated crop residue from the sugarcane harvester.

SUMMARY OF THE DISCLOSURE

According to an aspect of the present disclosure, an extractor for use with a sugarcane harvester comprises a fan and a hood. The fan is configured to rotate about a fan axis in an operational direction for inducing a cleaning flow of air to separate crop residue from sugarcane billets. The hood is positioned to receive in an interior region of the hood the cleaning flow of air with entrained crop residue from the fan and redirect the cleaning flow of air with entrained crop residue relative to the fan axis to an outlet of the hood to exit from the interior region. The hood defines a central plane that intersects the outlet. The fan axis is coincident with the central plane and a second plane intersecting and perpendicular to the central plane. Rotation of the fan is toward the outlet on a first side of the central plane and away from the outlet on a second side of the central plane when the fan rotates about the fan axis in the operational direction. The outlet comprises a first outlet extremity that, with respect to the first side of the central plane, is farthest away from the central plane and the second plane and a second outlet extremity that, with respect to the second side of the central plane, is farthest away from the central plane and the second plane. The first outlet extremity is positioned farther from the second plane than the second outlet extremity.

According to another aspect of the present disclosure, an extractor for use with a sugarcane harvester comprises a fan and a hood. The fan is configured to rotate about a fan axis in an operational direction for inducing a cleaning flow of air to separate crop residue from sugarcane billets. The hood is positioned to receive in an interior region of the hood the cleaning flow of air with entrained crop residue from the fan and redirect the cleaning flow of air with entrained crop residue relative to the fan axis to an outlet of the hood to exit from the interior region. The hood defines a central plane that intersects the outlet. The fan axis is coincident with the central plane. Rotation of the fan is toward the outlet on a first side of the central plane and away from the outlet on a second side of the central plane when the fan rotates about the fan axis in the operational direction. The outlet comprises, with respect to the central plane, a first outlet extremity on the first side of the central plane and a second outlet extremity on the second side of the central plane. The first outlet extremity and the second outlet extremity are positioned such that a line interconnecting the first outlet extremity and the second outlet extremity is oblique to the central plane.

The above and other features will become apparent from the following description and accompanying drawings.

BRIEF DESCRIPTION OF THE DRAWINGS

The detailed description of the drawings refers to the accompanying figures in which:

FIG. 10 is a bottom view of the hood;

DETAILED DESCRIPTION OF THE DRAWINGS

Figure 1:
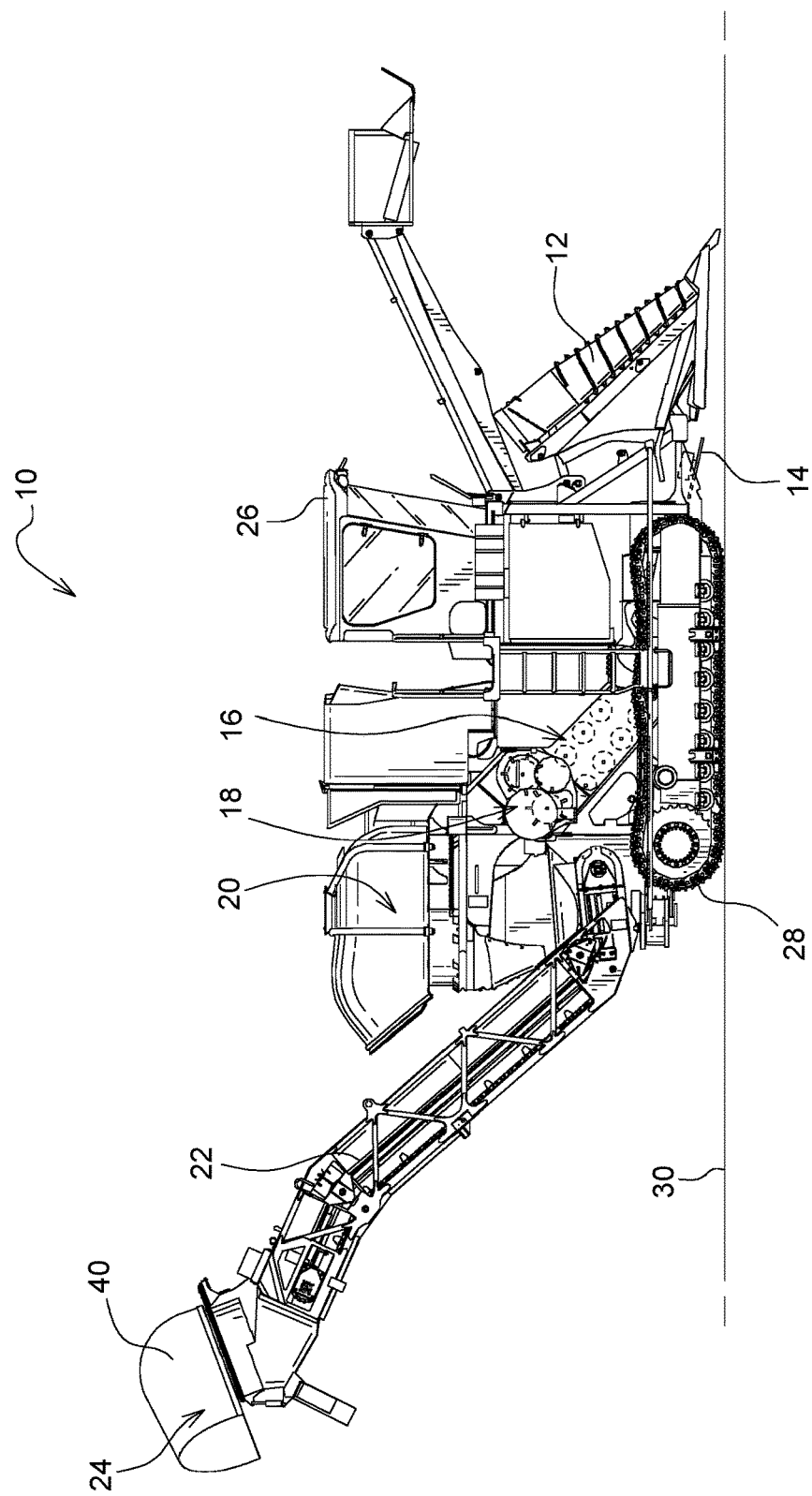
FIG. 1 is a side elevation view showing a sugarcane harvester with a secondary extractor mounted to the top of an elevator toward the rear of the sugarcane harvester.

Referring to FIG. 1, sugarcane harvester 10 is configured to harvest sugarcane. The harvester 10 comprises, for example, a left crop divider scroll 12 and a right crop divider scroll 12 (only the right crop divider scroll 12 being shown), an upper knockdown roller and a lower knockdown roller (the knockdown rollers not shown), a basecutter 14, a feed section 16, a chopping section 18, a primary extractor 20, an elevator 22, and a secondary extractor 24. The left and right crop divider scrolls 12 are configured to lift the sugarcane for feeding into the throat of the harvester 10. The basecutter 14 comprises a left cutting disk and a right cutting disk (only the right cutting disk being shown). The left and right cutting disks cooperate with one another to sever the stalk of sugarcane knocked down by the knockdown rollers at a location near the ground. The feed section 16 is configured to receive from the basecutter 14 a mat of severed sugarcane and to feed the mat rearwardly. The chopping section 18 is configured to receive the mat from the feed section 16 and cut the sugarcane stalk into segments called billets. The primary extractor 20 is positioned downstream from the chopping section 18 and is configured to separate crop residue from the billets and remove the crop residue from the harvester 10. The elevator 22 is positioned at the rear of the harvester 10 to receive the billets and crop residue that may not have been removed by the primary extractor 20 and is configured to convey the billets and remaining crop residue to an elevated position where the billets are discharged from the harvester 10 into a wagon to be hauled away. The secondary extractor 24 is mounted to the elevator 22 and is configured to separate crop residue from the billets.

The harvester 10 comprises an operator's station 26 and traction elements 32. A human operator can operate the harvester 10 from the operator's station 26. The traction elements 28 are positioned on the left and right sides of the harvester 10 for engaging the ground 30 and propelling the harvester 10. Each traction element 28 may be, for example, a track unit or a ground-engaging wheel (e.g., there is one track unit on each side of the harvester 10 as shown, for example, with respect to the right side in FIG. 1).

Figure 2:
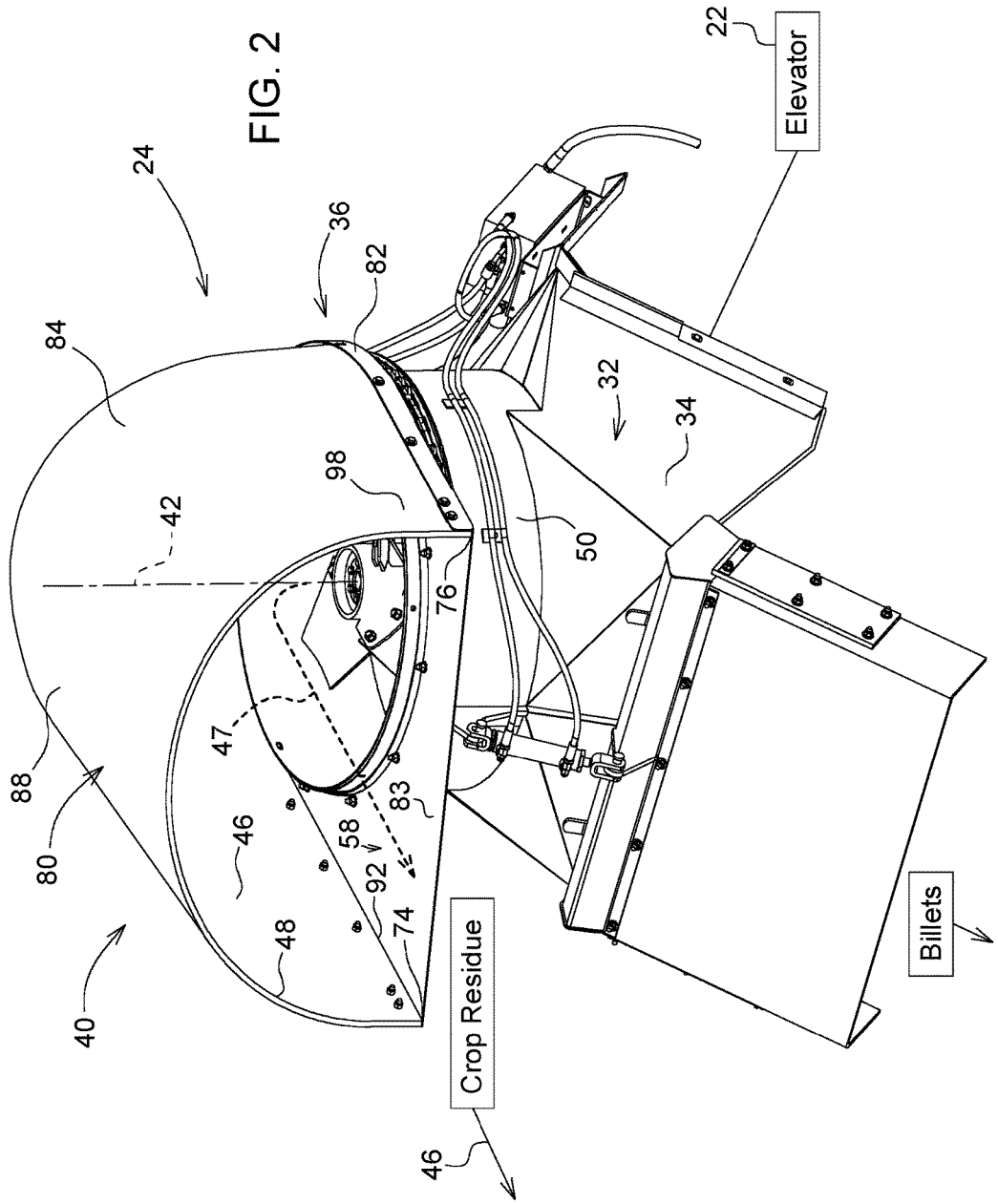
FIG. 2 is a perspective view showing the secondary extractor with a hood for discharge of crop residue that has been separated from sugarcane billets.
Figure 3:
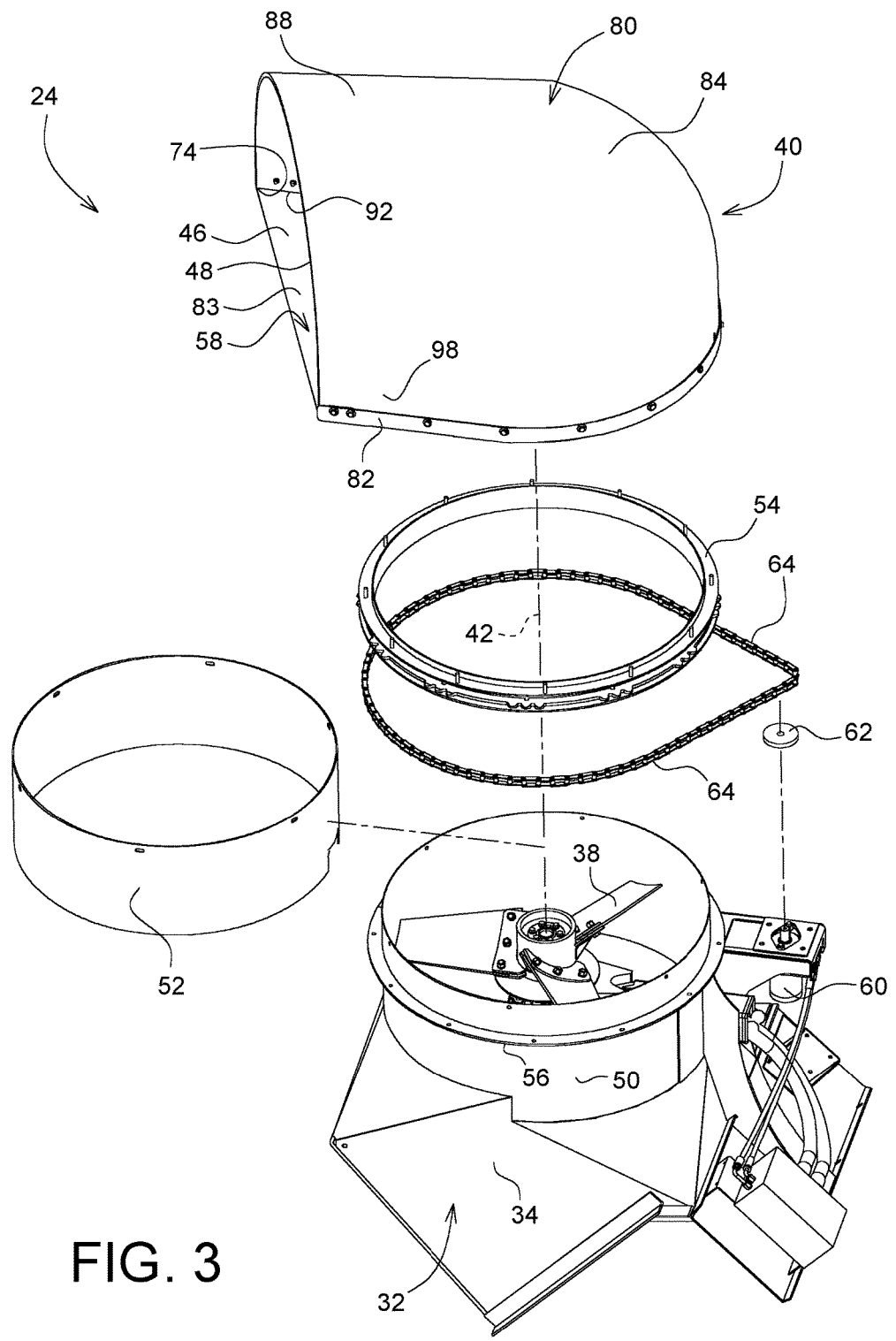
FIG. 3 is an exploded perspective view showing the secondary extractor.
Figure 4:
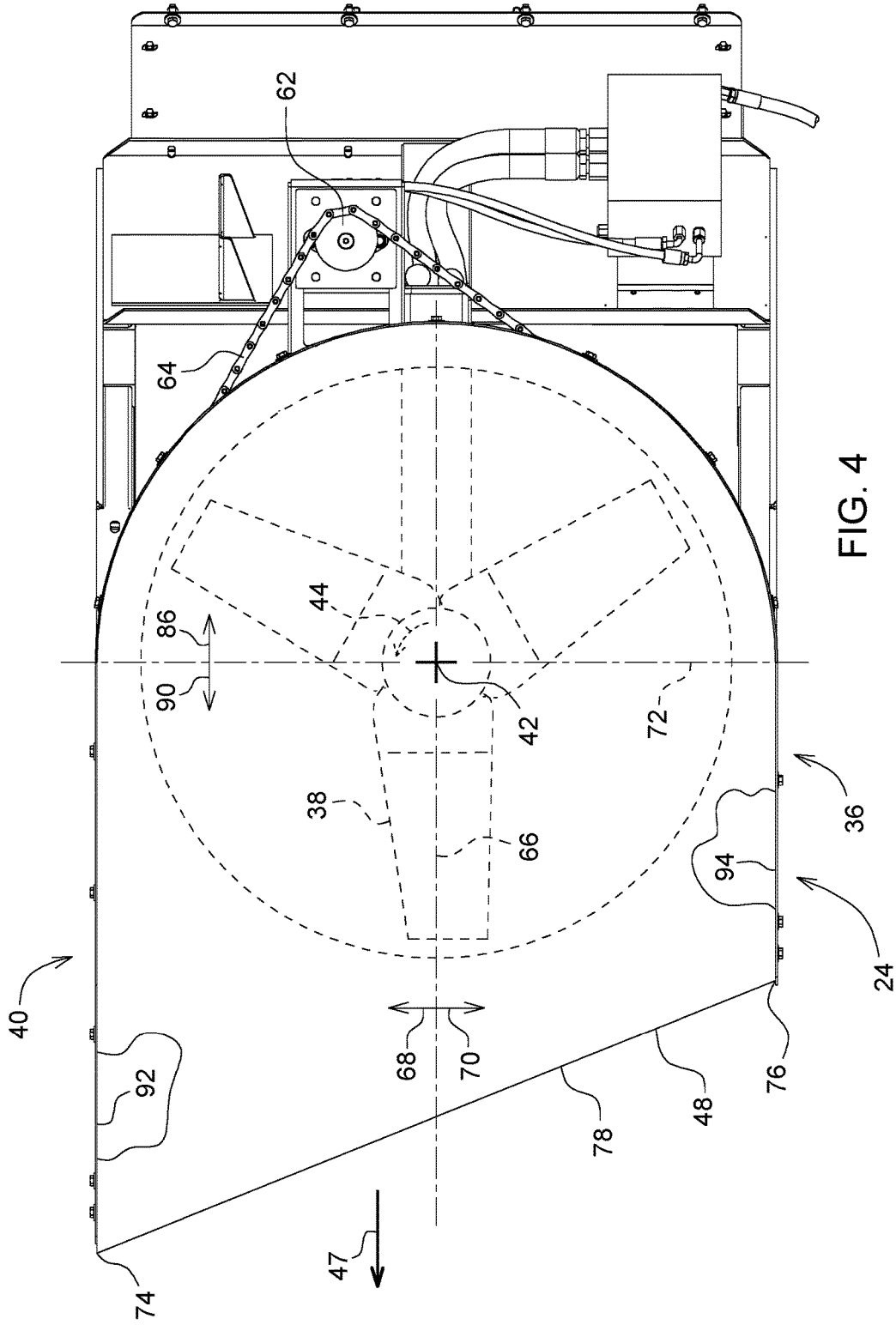
FIG. 4 is a top plan view showing the secondary extractor with an oblique outlet for reduction of fan power consumption due to flow inefficiencies.
Figure 5:
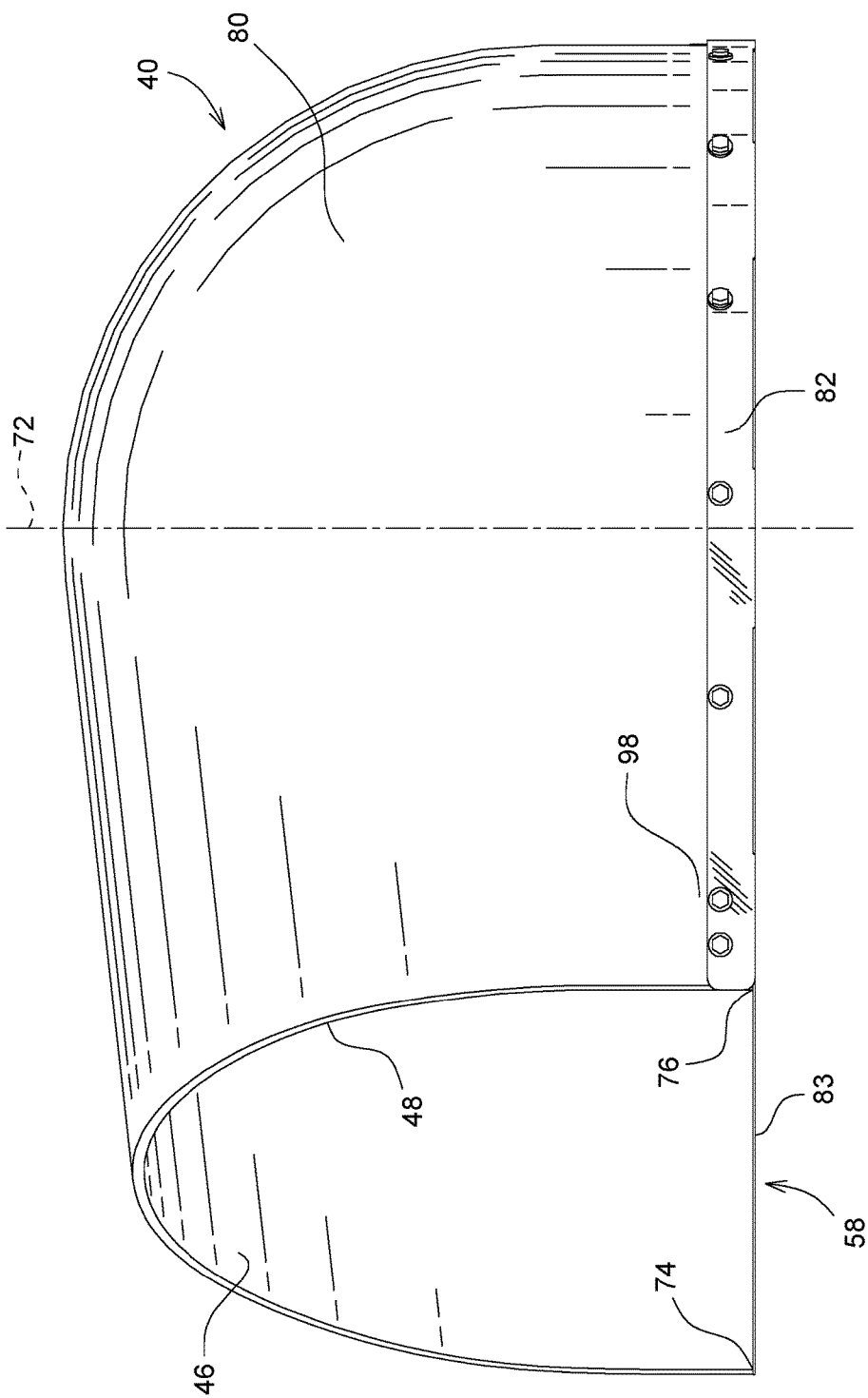
FIGS. 5 and 6 are opposite side elevational views of the hood.
Figure 6:
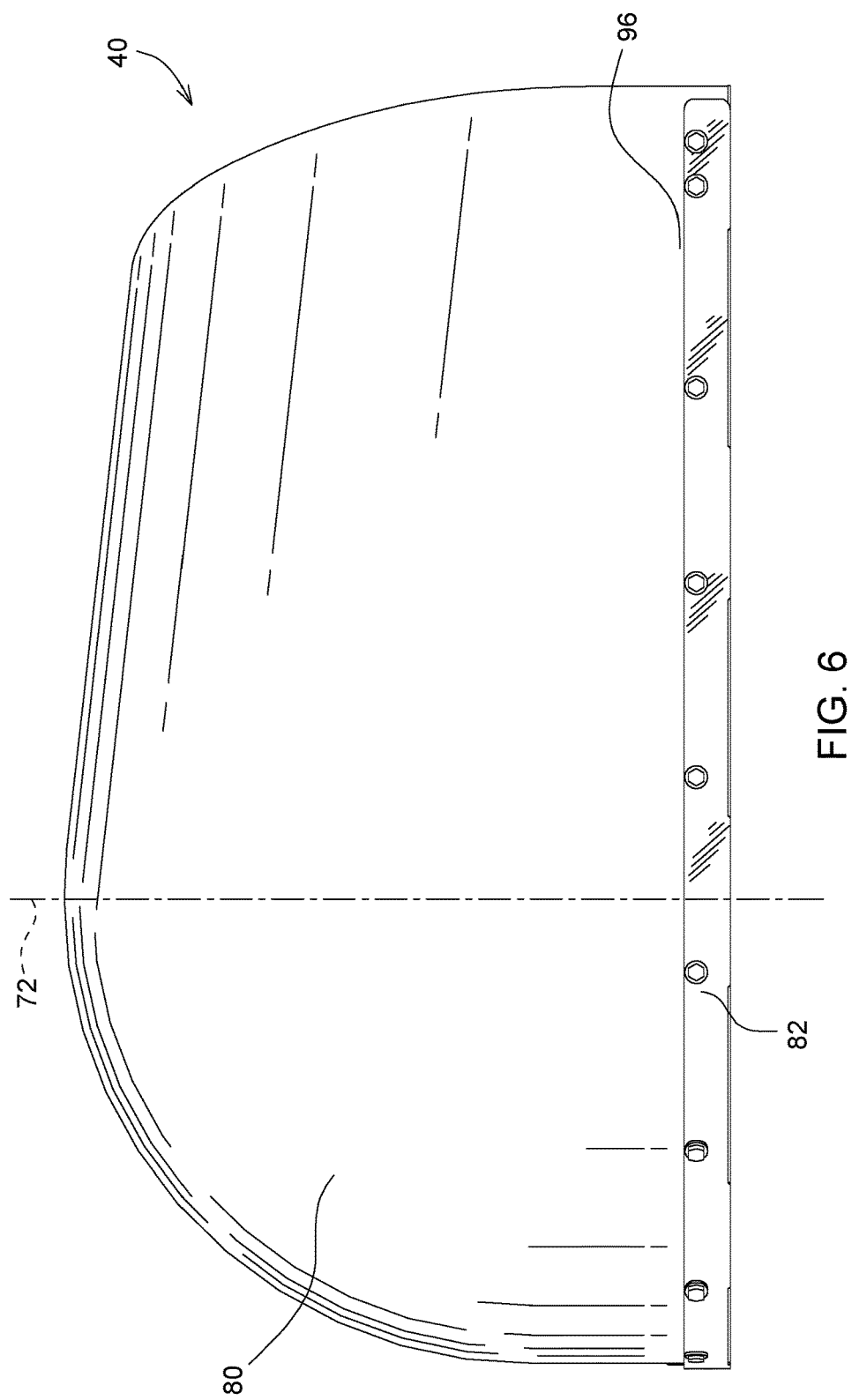
Figure 7:
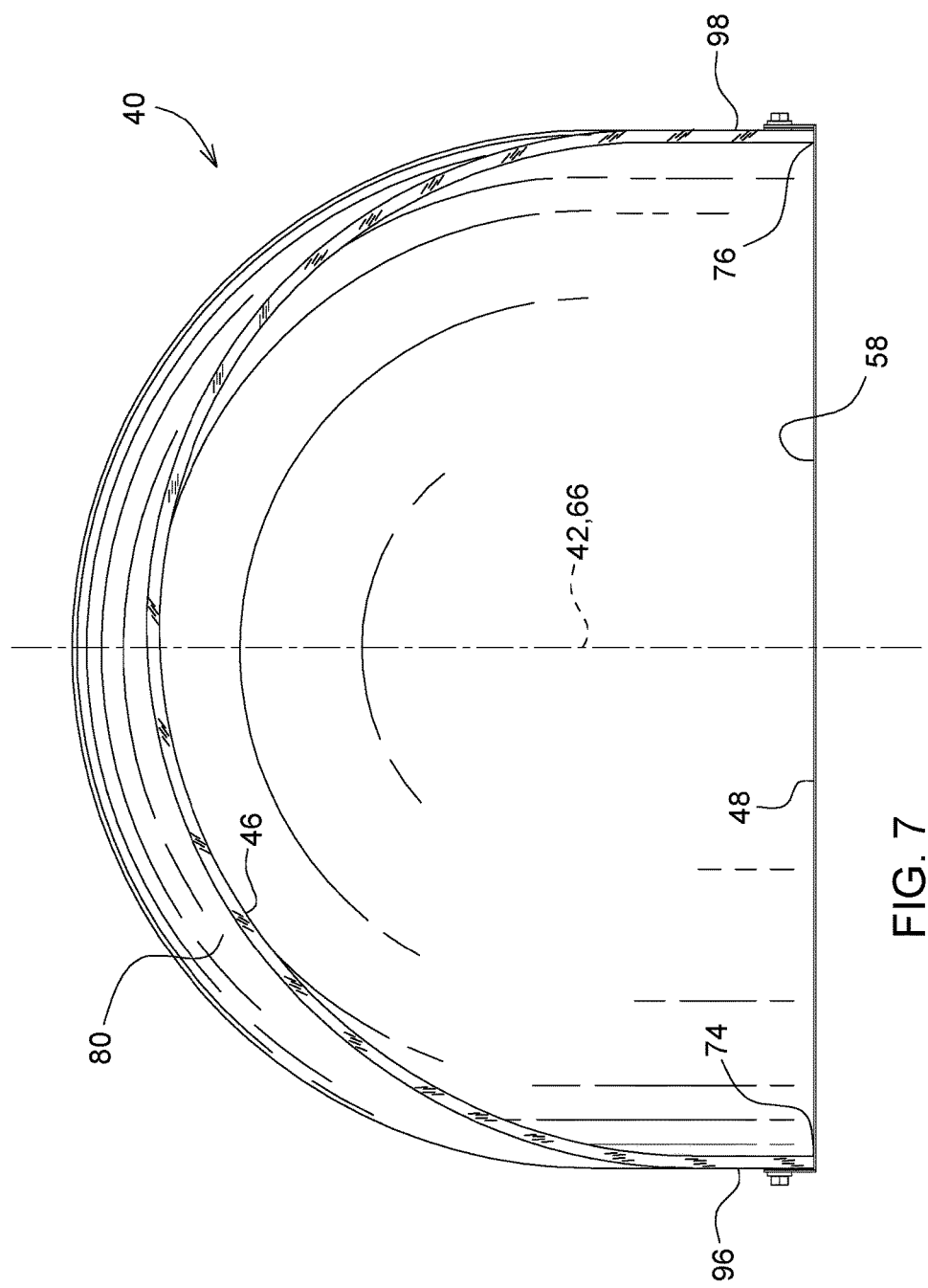
FIG. 7 is a front elevational view of the hood.
Figure 8:
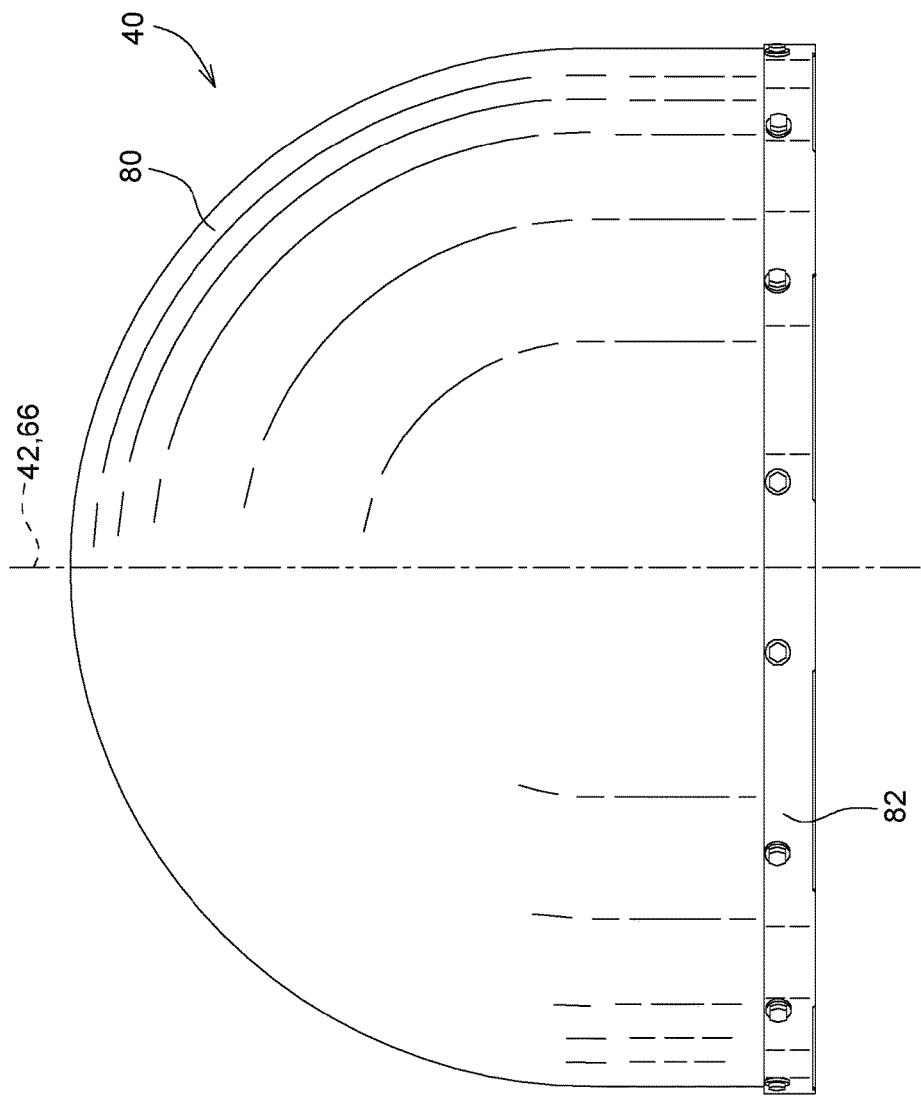
FIG. 8 is a rear elevational view of the hood.

Referring to FIGS. 2-4, the secondary extractor 24 comprises a frame 32. The frame 32 of the secondary extractor 24 is mounted to the frame of the elevator 22 in fixed relation thereto (e.g., bolted).

The secondary extractor 24 comprises a transition portion 34 and an extraction portion 36. A conveyor of the elevator 22 discharges sugarcane material into the air in a transition zone defined within the transition portion 34 of the frame 32. The extraction portion 36 of the secondary extractor 24 comprises a fan 38, mounted to the frame 32, and a hood 40 (made, for example, of a plastic via rotational molding). The fan 38 is configured to rotate about a fan axis 42 in an operational direction 44 for inducing a cleaning flow of air 47 through the transition zone to separate crop residue (e.g., leafy material) of the sugarcane material from sugarcane billets of the sugarcane material. The hood 40 is positioned to receive in an interior region 46 of the hood 40 the cleaning flow of air 47 with entrained crop residue from the fan 38 and redirect the cleaning flow of air 47 with entrained crop residue relative to the fan axis 42 to an outlet 48 of the hood 40 where the cleaning flow of air 47 with entrained crop residue exits the interior region 46. In this way, crop residue is separated from the billets, so that the billets discharged from the elevator 22 can thereby be received by a following billet-collection wagon with minimal or an otherwise reduced amount of crop residue.

Referring to FIG. 3, the extraction portion 36 comprises a structural ring 50, a wear ring 52, and a rotator ring 54. The structural ring 50 is included in the frame 32 (e.g., part of the weldment of the frame 32). The wear ring 52, made, for example, of steel, is installed within the structural ring 50. Crop residue flowing through the extraction portion 36 may cause the wear ring 52 to wear, in which case the wear ring 52 may be replaced with a fresh wear ring.

The rotator ring 54 is positioned around the structural ring 50 and rotatable on a support flange 56 fixed (e.g., welded) to the outer surface of the structural ring 50. A floor 58 of the hood 40 is fixed (e.g., bolted) to the rotator ring 54. A motor 60 (e.g., hydraulic motor or other suitable motor) is coupled to a sprocket 62 (shown diagrammatically as a disk but should be understood to have suitable teeth) engaging a chain 64 which, in turn, engages teeth of the rotator ring 54. As such, operation of the motor 60 (e.g., by a person at the operator's station 26) can cause the rotator ring 54 and the hood 40 mounted thereto to rotate about the axis 42 to direct discharge of the cleaning flow of air 47 with crop residue entrained therein where desired.

Referring to FIG. 4, the hood 40 is designed for reduction of fan power consumption due to flow losses in the interior region 46 of the hood 40. The hood 40 defines a central plane 66 that intersects the outlet 48. The configuration of the outlet 48 is oblique relative to the central plane 66 so that higher velocity air flow exits the interior region 46 through the outlet 48 before striking the hood 40 on a side 70 of the central plane 66, for avoidance or otherwise reduction of a dead flow of air (causing high pressure restrictions) and a reverse flow of air on the side 70.

The fan axis 42 is coincident with the central plane 66 and a second plane 72 intersecting and perpendicular to the central plane 66. Rotation of the fan 38 is toward the outlet 48 on a first side 68 of the central plane 66 and away from the outlet 48 on the second side 70 of the central plane 66 when the fan 38 rotates about the fan axis 42 in the operational direction 44.

The outlet 48 comprises, with respect to the central plane 66, a first outlet extremity 74 on the first side 68 of the central plane 66 and a second outlet extremity 76 on the second side 70 of the central plane 66. The first outlet extremity 74 is positioned farther from the second plane 72 than the second outlet extremity 76, and is, for example, farther from the fan axis 42 than the second outlet extremity 76. Higher velocity air flow is able to exit the interior region 46 through the outlet 48 before striking the hood 40 on the second side 70 of the central plane 66.

The outlet 48 comprises a first outlet extremity 74 on the first side 68 of the central plane 66 and a second outlet extremity 76 on the second side 70 of the central plane 66. With respect to the first side 68 of the central plane 66, the first outlet extremity 74 is positioned farthest away from the central plane 66 and the second plane 72. With respect to the second side 70 of the central plane 66, the second outlet extremity 76 is positioned farthest away from the central plane 66 and the second plane 72.

Figure 9:
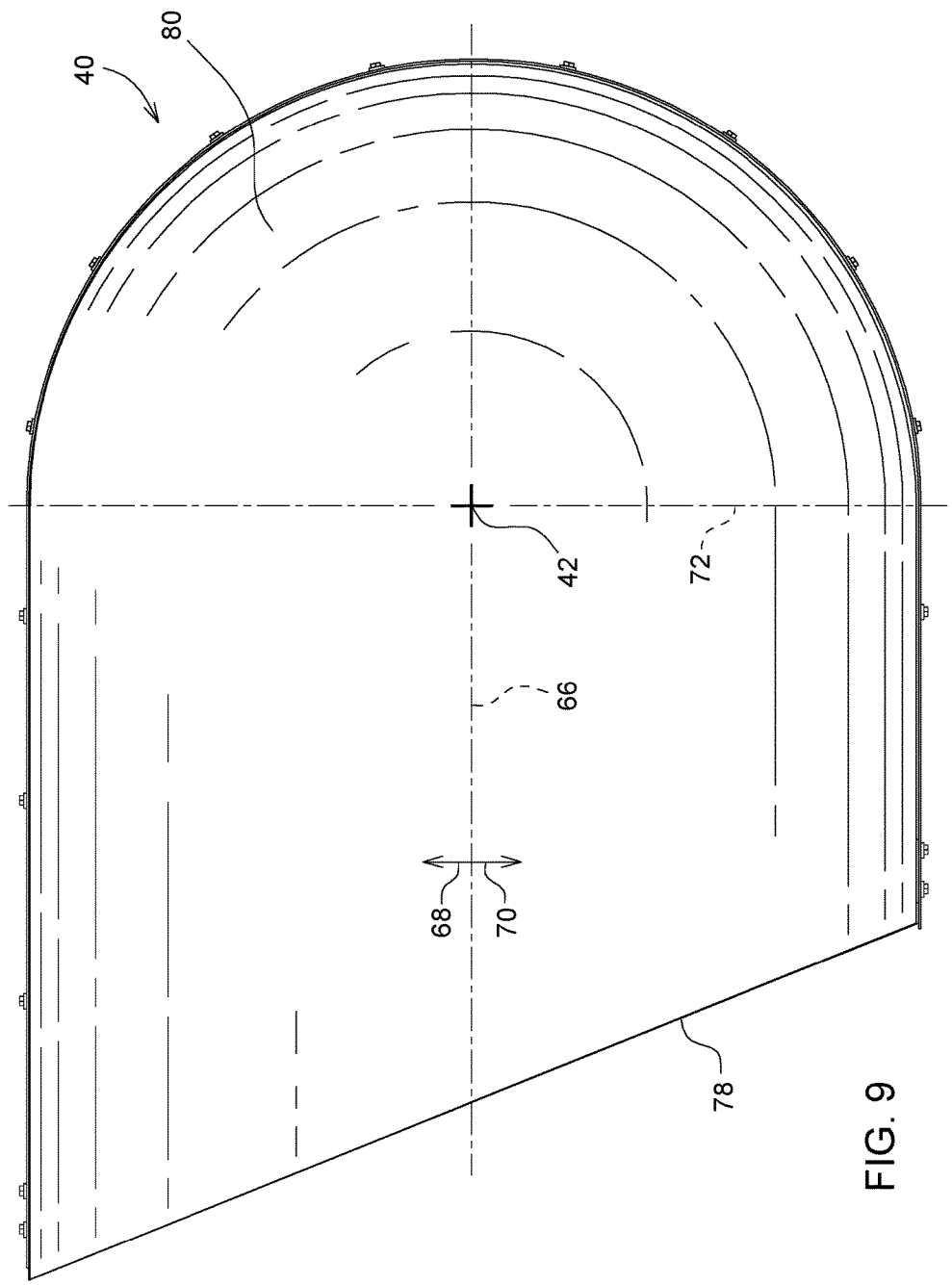
FIG. 9 is a top plan view of the hood.

The first outlet extremity 74 and the second outlet extremity 76 are positioned such that a line 78 interconnecting the first outlet extremity 74 and the second outlet extremity 76 is oblique to the central plane 66. Illustratively, the line 78 coincides with the outlet 48 such that the outlet 48 angles from the first outlet extremity 74 to the second outlet extremity 76 when viewed as in FIGS. 4 and 9. In other embodiments, the outlet 48 may take the form of a wide variety of other shapes (e.g., for stylistic or functional reasons), including that the portion of the outlet 48 defined by a cover 80 of the hood 40 and the portion of the outlet 48 defined by the floor 58 of the hood 40 may be differ from one another in their distance from the second plane 72 as they extend from the first outlet extremity 74 to the second outlet extremity 76, yet the line 78 interconnecting the first and second outlet extremities 74, 76 remains oblique to the central plane 66 (since it is an imaginary line), regardless whether the outlet 48 is oblique at the exact point it traverses the central plane 66. As such, the outlet 48 may be described as an "oblique outlet."

The hood 40 comprises the floor 58 and a cover 80. The cover 80 is positioned over and mounted to the floor 58 such that the floor 58 and the cover 80 cooperate to provide the interior region 46. The floor 58 comprises a rim 82 to which the cover 80 is mounted (e.g., bolted) and a base plate 83 to which the rim 82 is coupled (e.g., welded). Each of the floor 58 and the cover 80 extends farther from the second plane 72 on the first side 68 of the central plane 66 than on the second side 70 of the central plane 66.

Referring to FIGS. 4-10, the cover 80 is curved and comprises, for example, a first cover portion 84 on a first side 86 of the second plane 72 and second cover portion 88 on a second side 90 of the second plane 72. The first cover portion 84 is spherical (e.g., a quarter of a sphere). The second cover portion 86 has an arch shape that tapers relative to the floor 58 as it extends away from the second plane 72 to the outlet 48.

The hood 40 comprises a first side edge 92 on the first side 68 of the central plane 66 and a second side edge 94 on the second side 70 of the central plane 66 (FIG. 4). The floor 58 and the cover 80 cooperate to provide the first side edge 92 and the second side edge 94. The first and second side edges 92, 94 terminate respectively at the first outlet extremity 74 and the second outlet extremity 76, each extremity 74, 76 being a point at the interface of the floor 58 and the cover 80.

Thus, the floor 58 and the cover 80 cooperate to provide the first outlet extremity 74 and the second outlet extremity 76.

The cover 80 comprises a first side wall 96 and a second side wall 98. Illustratively, the first cover portion 84 comprises the first side wall 96 and the second side wall 98. Each side wall 96, 98 extends from the second plane 72 to the outlet 48. The first side wall 96 is longer than the second side wall 98. Each of the first side wall 96 and the second side wall 98 is a vertical portion of the first cover portion 84. The first outlet extremity 74 is a point at the interface of the floor 58 and the first side wall 96, and the second outlet extremity 76 is a point at the interface of the floor 58 and the second side wall 98. In other embodiments, one or both of the outlet extremities 74, 76 may be, for example, a linear edge (instead of point) along the respective side wall 96, 98. This could be the case if, for example, the respective side wall 96, 98 were initially perpendicular to the floor 58 as it extends therefrom before turning and eventually extending to the other side wall 96, 98.

As alluded to herein, the hood 40 is designed for reduction of fan power consumption, due to flow losses in the interior region 46 of the hood 40, to promote a hydraulic power savings. Further, considering that the extractor 24 mounted at the end of the elevator 22 applies a moment to the harvester 10, reduction of the weight of the hood 40 by the oblique configuration of the hood 40, and thus the overall weight of the extractor 24, promotes the stability of the harvester, such as when the elevator 22 is turned to the side to load a wagon.

The primary extractor 20 could be configured to have an oblique hood, similar to the hood 40. This could provide for a reduction in power consumption by the fan of the primary extractor 20 for a hydraulic power savings, as well as a reduction in the weight of the primary extractor 20 for fuel efficiency.

Welds and threads are not shown in the drawings for ease of illustration, but their presence is to be understood.

While the disclosure has been illustrated and described in detail in the drawings and foregoing description, such illustration and description is to be considered as an example and not restrictive in character, it being understood that an illustrative embodiment has been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. An extractor for use with a sugarcane harvester, comprising:
   a fan configured to rotate about a fan axis in an operational direction for inducing a cleaning flow of air to separate crop residue from sugarcane billets, and
   a hood positioned to receive in an interior region of the hood the cleaning flow of air with entrained crop residue from the fan and redirect the cleaning flow of air with entrained crop residue relative to the fan axis to an outlet of the hood to exit from the interior region, the hood defining a central plane that intersects the outlet, the fan axis coincident with the central plane and a second plane intersecting and perpendicular to the central plane, rotation of the fan being toward the outlet on a first side of the central plane and away from the outlet on a second side of the central plane when the fan rotates about the fan axis in the operational direction, the outlet comprising a first outlet extremity that, with respect to the first side of the central plane, is farthest away from the central plane and the second plane and a second outlet extremity that, with respect to the second side of the central plane, is farthest away from the central plane and the second plane, the first outlet extremity positioned farther from the second plane than the second outlet extremity, wherein the hood comprises a first side edge on the first side of the central plane and a second side edge on the second side of the central plane, and the first and second side edges are straight and parallel to the central plane and terminate respectively at the first outlet extremity and the second extremity.

2. The extractor of claim 1, wherein the first outlet extremity and the second outlet extremity are positioned such that a line interconnecting the first outlet extremity and the second outlet extremity is oblique to the central plane.

3. The extractor of claim 1, wherein the first outlet extremity is farther from the fan axis than the second extremity.

4. The extractor of claim 1, wherein the hood comprises a floor and a cover positioned over and mounted to the floor such that the floor and the cover cooperate to provide the interior region, the first side edge, and the second side edge.

5. The extractor of claim 1, wherein the hood comprises a floor and a cover mounted to the floor such that the cover and the floor cooperate to provide the first outlet extremity and the second extremity.

6. The extractor of claim 1, wherein the hood comprises a floor and a cover positioned over and mounted to the floor such that the floor and the cover cooperate to provide the interior region, and each of the floor and the cover extends farther from the second plane on the first side of the central plane than on the second side of the central plane.

7. A sugarcane harvester comprising the extractor of claim 1.

8. The sugarcane harvester of claim 7, comprising an elevator, wherein the extractor is mounted to the elevator.

9. An extractor for use with a sugarcane harvester, comprising:
   a fan configured to rotate about a fan axis in an operational direction for inducing a cleaning flow of air to separate crop residue from sugarcane billets, and
   a hood positioned to receive in an interior region of the hood the cleaning flow of air with entrained crop residue from the fan and redirect the cleaning flow of air with entrained crop residue relative to the fan axis to an outlet of the hood to exit from the interior region, the hood defining a central plane that intersects the outlet, the fan axis coincident with the central plane, rotation of the fan being toward the outlet on a first side of the central plane and away from the outlet on a second side of the central plane when the fan rotates about the fan axis in the operational direction, the outlet comprising, with respect to the central plane, a first outlet extremity on the first side of the central plane and a second outlet extremity on the second side of the central plane, the first outlet extremity and the second outlet extremity positioned such that a line interconnecting the first outlet extremity and the second outlet extremity is oblique to the central plane, wherein the hood comprises a first side edge on the first side of the central plane and a second side edge on the second side of the central plane, and the first and second side edges are straight and parallel to the central plane and terminate respectively at the first outlet extremity and the second extremity.

10. The extractor of claim 1, wherein the hood comprises a floor and a cover positioned over and mounted to the floor such that the floor and the cover cooperate to provide the interior region, the first outlet extremity, and the second outlet extremity.

* * * * *